Hammond & Reeves.
Bridge Truss.
N° 86,538.   Patented Feb. 2, 1869.

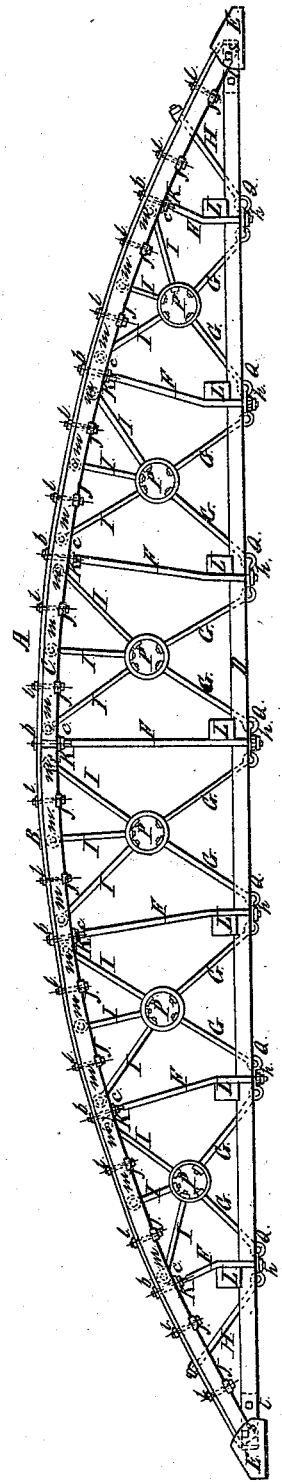

Sheet 2, 3 Sheets.

Witnesses.
Ruth K. Abbott
Ea A Thibout

Inventor.
David Hammond
W. R. Reeves
By Jab Abbott
ATTORNEY.

N. PETERS, PHOTO-LITHOGRAPHER, WASHINGTON, D.C.

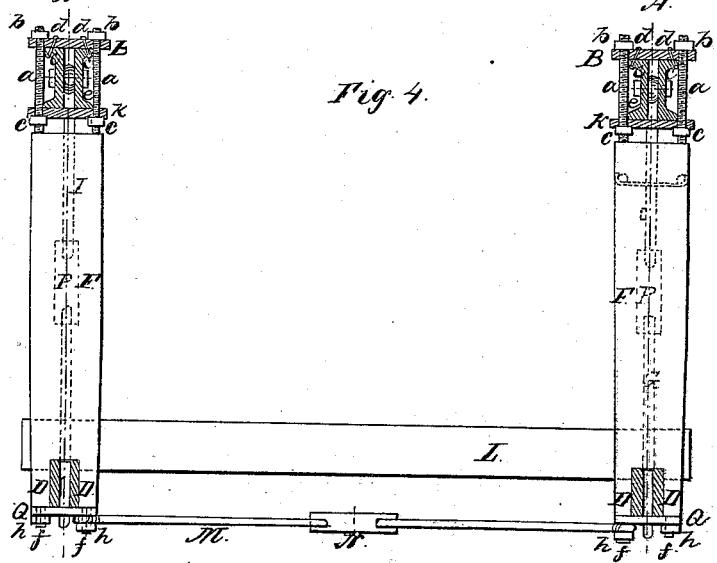# Hammond & Reeves.
Bridge Truss.
No. 86,538. Patented Feb. 2, 1869.
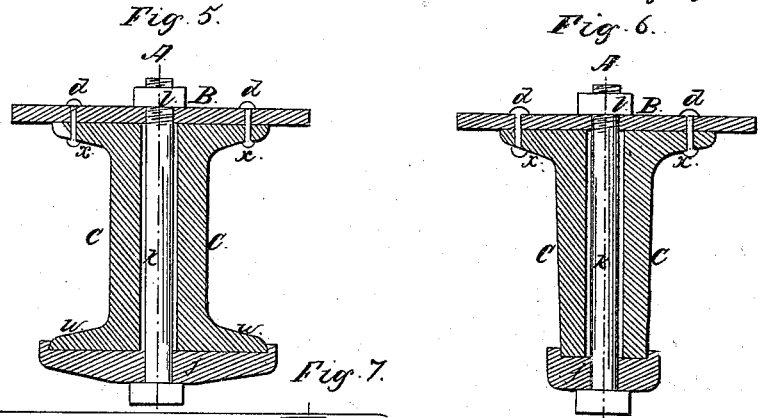
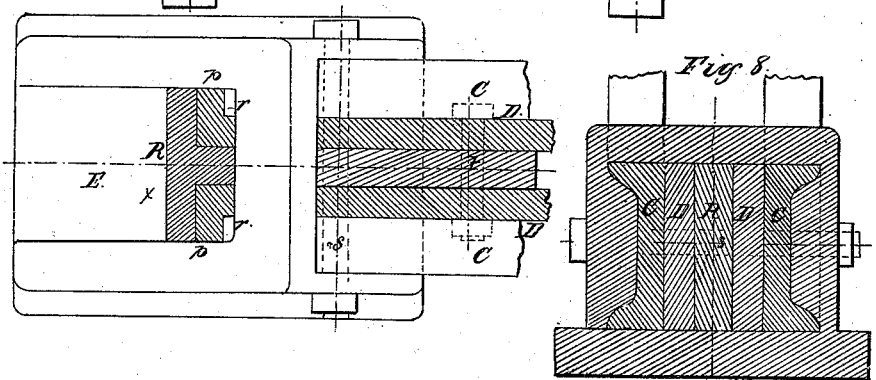
Witnesses:
Ruth K. Abbott
Ed A. Bebout
Inventor:
David Hammond
W. R. Reeves
BY J. L. Abbott
ATTORNEY.

UNITED STATES PATENT OFFICE.

DAVID HAMMOND AND W. R. REEVES, OF CANTON, OHIO.

Letters Patent No. 86,538, dated February 2, 1869.

---

IMPROVED GIRDER FOR BRIDGES.

---

The Schedule referred to in these Letters Patent and making part of the same.

---

*To all whom it may concern:*

Be it known that we, DAVID HAMMOND and W. R. REEVES, both of Canton, in the county of Stark, and State of Ohio, have invented new and useful Improvements in Wrought-Iron Girders for Bridges and other structures; and we do hereby declare that the following is a full, clear, and exact description of our invention, reference being had to the accompanying drawings, forming a part of this specification, and to the letters of reference marked thereon, of which drawings—

Figure 1 is a side view of our improved girder, applied to a bridge.

Figure 4 is a cross-section of the same.

Figures 5 and 6 are two forms of cross-section for the arch.

Figures 7 and 8 are plan and section, showing the details of the shoe, with its block and the chord and arch-pieces.

Figure 3:
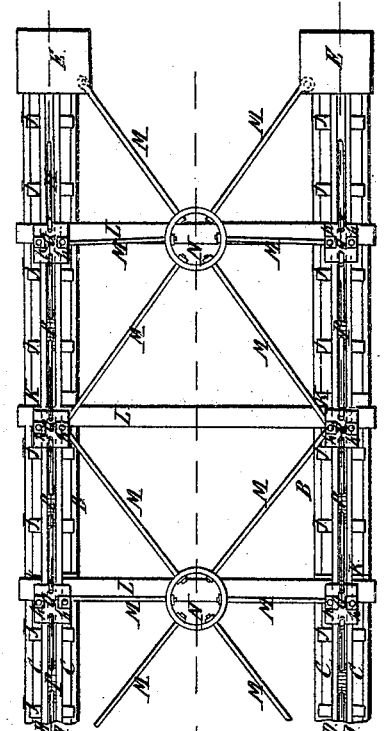
Figure 3 is a half plan of the same, as seen from below the bridge.
Figure 2:
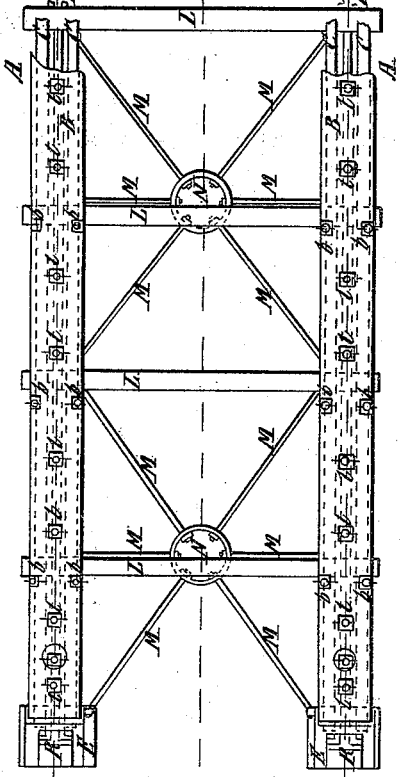
Figure 2 is a half plan of the same.

The nature of our invention consists in new and useful improvements in the construction of the girder shown in our patent of June 21, 1864, said improvements consisting, first, in the use of channel or L-iron for the arch-pieces, in the place of the plate-iron there shown, by the use of which we are enabled to firmly rivet the arch-pieces and covering-piece together, instead of depending wholly on the clamping-bolts, clamping-pieces, and suspension-rods and bracing for the binding of said pieces together, as in the case of our previous patent, whereby we greatly increase the resistance of our arch to any horizontal deflection, and thus greatly increase its strength; and second, in the peculiar manner of securing the ends of the arch-pieces and chords in the shoes, whereby we greatly lessen the probability of their pulling apart, and thus increase the stability of our girder.

To enable others skilled in the art to make and use our improved girder, we will proceed to describe its construction and application.

The arch A of each girder is composed of three principal pieces, B C C, the two arch-pieces C C being formed of channel or L-iron, as shown in figs. 5 and 6, which are curved to the proper shape, and set up parallel to each other, as shown.

The covering-piece B is made of heavy plate-iron, and is laid on the top of the two arch-pieces C C, as shown.

The rivets $d\ d$, or bolts if preferred, pass through the upper flanges $x\ x$, which are formed on the arch-pieces C C, when they are rolled, and through the covering-piece B, thus firmly binding them together.

The clamping-pieces J J are made as shown in detail in figs. 5 and 6, and are secured by the bolts $k\ k$, which pass through them, and up between the arch-pieces C C, through the covering-piece B, and are secured by nuts $l\ l$, as shown.

The chords D D of the girder are formed of two pieces of plate-iron, set up parallel to each other, and have the heads $p\ p$ formed on one side at their ends, as shown in fig. 7.

They rest at said ends between the arch-pieces D D in the shoe E, the heads $p\ p$, bearing against the parts $r\ r$ of the shoe, as shown.

The arch-pieces C C abut against suitably-formed faces in the shoes E, and a block, R, having a head, as shown, or without this head, if desired, is inserted between the chords D D.

A bolt, $s$, passes through the sides of the shoe E, the arch-pieces C C, chords D D, and the block R, thus firmly uniting them together.

It is readily seen that if the block R be made with a head, as shown, and one or more bolts, $t$, be bolted through the chords D D and the block R, that the strength of resistance to any tendency of the chords D D to pull out of the shoe E will be greatly increased, although a good combination of the arch-pieces, chords, and shoe may be effected without the use of the head on the block R, if the heads $p\ p$ on the chords D D be made very strong and heavy.

The suspension-rods F are made of thin plate-iron, bent in the form shown by red-dotted cross-section in fig. 4, and have the bolts $a\ a$ and $f\ f$ attached to them, as shown.

The bolts $a\ a$, which are attached to the upper part of the suspension-rods F, pass through the irons $k$, which bear on the lower parts of the arch-pieces C C, thence up, by the sides of said arch-pieces, through the covering-piece B.

The nuts $b\ b$ and $c\ c$ on the bolts $a\ a$ bind the arch A and the irons $k$ firmly together, and thus serve to aid in the combining of the arch, and to attach the suspension-rods to the arch.

Slots are cut in the lower part of the suspension-rods F, which admit the chords D D, and the bolts $f\ f$, at the lower ends of the suspension-rod F, pass through the irons Q Q, on which the chords D D rest, and have the nuts $h\ h$, which support the irons Q Q, and thus complete the connection between the arch and chords.

The irons Q Q have their edges rolled, and holes punched in them, into which are hooked the braces G G, as shown.

These braces are inserted between the chords D D, and run into the rings P P, as shown.

Other braces, I I, are secured to the arch A by means of eyes $m$, formed on their ends, which set between the arch-pieces C C, and are secured by bolts $e\ e$, which pass through the arch-pieces C C and the eyes on said braces I I.

The end braces H H are secured to the covering-piece B, as shown in fig. 1.

The braces I I run into the rings P P, and, in connection with the braces G G and posts F F, form a firm trussing against any vertical deflection of the arch.

The horizontal braces M M have eyes formed on their ends, which are put over the bolts $f$, under the irons Q, and above the nuts $h$, as seen in fig. 4.

The end-braces are attached to the shoes E E, as shown, and the braces unite in rings N, thus forming a firm bracing against any lateral vibrations of the bridge.

The cross-stringers L L are notched down on to the chords D D, as shown, and the flooring of the bridge may be laid on them in a diagonal manner, to aid in bracing the bridge against lateral vibrations, or floor-stringers may be laid across these cross-stringers, and the flooring laid in the ordinary manner.

Having thus fully described the construction of our improved girder, we do not here claim as our invention the principle of combining the three arch-pieces B C C by means of the clamping-piece J, clamping-bolt $k$, and nut $l$, nor the manner of combining the suspension-rods F, braces G G H, arch A, and chords D D, nor the cross-beams L, horizontal or vertical bracing M M and G I, here shown, or the mode of constructing the suspension-rods F, nor the shoes E, or chords D D; but

What we do claim as our invention, and desire to secure by Letters Patent, is—

1. The peculiar arrangement and combination of the plates C C, flanges $x\ x$, bolts or rivets $d\ d$, covering-piece B, bolt $k$, and clamping-pieces J, when said flanges $x\ x$ are formed on the plates C C when rolled, and whether the lower flanges $w\ w$ are or are not used, the several parts being arranged substantially as and for the purpose herein specified.

2. The peculiar arrangement and combination of the arch-pieces C C, chords D D, with heads $p\ p$ thereon, block R, and shoe E, the several parts being arranged substantially in the manner and for the purpose herein specified.

As evidence that we claim the foregoing, we have hereunto set our hands, in the presence of two witnesses, this 3d day of March, 1868.

DAVID HAMMOND.
W. R. REEVES.

Witnesses:
  JOB ABBOTT,
  ED. N. BEEBOUT.